Jan. 4, 1966

H. BLADES ETAL 3,227,664

ULTRAMICROCELLULAR STRUCTURES OF CRYSTALLINE ORGANIC POLYMER

Filed Jan. 31, 1962

METHYLENE CHLORIDE - LINEAR POLYETHYLENE

INVENTORS
HERBERT BLADES
JAMES RUSHTON WHITE
BY Sol Schwarz
ATTORNEY

INVENTORS
HERBERT BLADES
JAMES RUSHTON WHITE

INVENTORS
HERBERT BLADES
JAMES RUSHTON WHITE

३,२२७,६६४
ULTRAMICROCELLULAR STRUCTURES OF CRYSTALLINE ORGANIC POLYMER
Herbert Blades, Wilmington, Del., and James Rushton White, Chadds Ford, Pa., assignors to E. I. du Pont de Nemours and Company, Wilmington, Del., a corporation of Delaware
Filed Jan. 31, 1962, Ser. No. 170,187
12 Claims. (Cl. 260—2.5)

This invention relates to ultramicrocellular polymer structures, and to a flash extrusion process for preparing these and related structures. This case is a continuation-in-part of applications Serial Nos. 858,725 and 858,772, filed December 10, 1959 and Serial No. 736,337, filed May 19, 1958 which are in turn continuations-in-part of application Serial No. 665,099, filed June 11, 1957. All of said applications are abandoned.

The porous polymer structures which heretofore are well known in the art can generally be described as consisting of a solid polymer matrix having distributed therein voids which may be either isolated or intercommunicating. The shape of such voids varies all the way from spherical pockets to quite irregular channels depending on their method of preparation. Irregular channels normally arise, for example, when the porous article has been prepared by partial fusion of the surfaces of the particles of a granular polymer mass. Extraction of a fugitive material (e.g., salt crystals) from a solidified mixture of molten polymer containing a major proportion of said fugitive material has also yielded irregular channels.

Other prior art processes generally tend to give more nearly spherical voids. One procedure has been to distribute a solid blowing agent throughout a polymer mass and heat this mixture above the polymer softening temperature whereupon the blowing agent decomposes to gaseous products which are trapped within the polymer to produce voids. Another method has been to whip a molten polymer into a coarse froth and cool the same to solidification. The bubble size may be controlled in part by addition of surface active agents or by extrusion through bubble comminuting screens.

A critical feature in all of the above processes is stabilization of the porous product before the hot polymer collapses and destroys the structure. Various ways to improve the form stability of the hot structure include quenching in a liquid coolant or lightly cross-linking the polymer, either chemically or by irradiation.

Another problem is control of bubble size. Some control has been achieved in the prior art processes by adjusting temperature, blowing agent, or gas concentration, rate of expansion, addition of surface active agents, and extrusion through screens as mentioned above. It has also been reported that when fillers are added, smaller sized bubbles are produced, although the primary purpose of the fillers has generally been to increase opacity, furnish color, lower cost, or improve strength or stiffness.

It is an object of the present invention to provide an ultramicrocellular shaped structure of synthetic organic crystalline polymer. Another object is to provide such a structure which is supple nad has high strength and relatively low apparent density. Still another object is to provide ultramicrocellular yarns and sheets which are uniform and opaque, even in thin sections. Other objects will appear hereinafter.

In accordance with the invention there is provided an ultramicrocellular structure of a synthetic linear crystalline organic polymer of film-forming molecular weight, substantially all of said polymer being present as filmy walls of generally polyhedral shaped cells, individual filmy walls being less than 2 microns in thickness and exhibiting uniform texture as indicated by having over the whole area of the cell wall a substantially uniform thickness and density as determined interferometrically at a resolution of ½ micron and a uniform polymer orientation as evidenced by uniform extinction in a birefringence test at a resolution of ½ micron, the crystallites of said polymer in individual filmy walls exhibiting uniplanar orientation with reference to the surface of the filmy wall as indicated by the appearance of at least one of the equatorial diffractions of the wall with less than one-half its normal relative intensity when compared to a randomly oriented sample of the same polymer.

These ultramicrocellular structures are integral products comprised of open and closed cells in any proportion. Open cells are usually formed from closed cells whose end walls (i.e., those generally perpendicular to the machine direction) have ruptured. These frequently occur in sequences, leading to tunnels or channels.

With regard to other characteristics of the ultramicrocellular structures, the thickness of a cell wall, bounded by intersections with other walls, does not vary by more than ±30%. Adjacent walls have equal thickness within a factor of 3. In strand form, the ultramicrocellular structures have a tenacity of at least 0.1 g.p.d. The ultramicrocellular sheets have, in general, a tenacity of at least 5 lbs./in.//oz./yd.$^2$ in at least one direction and a TAPPI opacity of at least 70% at 1 oz./yd.$^2$ The apparent density of the Products ($\rho$) is between 0.5 and 0.005 g./cc. The number of cells per cc. ($\gamma_f$), is at least $10^5$, preferably $10^8$ or greater, as estimated from the equation $$\gamma_t = \left(\frac{\rho}{3t\rho_0}\right)^3$$

where $t$ is the wall thickness in cm., and $\rho_0$ is the bulk polymer density.

The wall thickness and transverse cell dimensions are determined by microscopic examination of cross sections cut perpendicular to the machine direction. Thus 20–60 micron thick sections may be cut from a frozen sample with a razor blade. Large cell (>50 microns) samples are frozen directly in liquid nitrogen. Smaller celled samples are preferrably "imbedded" in water containing a detergent, and then frozen and sectioned. The transverse dimension of one or more cells can be readily measured by the freezing and sectioning technique mentioned above which at least partially inflates the cells. The cells will then exhibit a general polyhedral shape as illustrated in FIGURE 7, similar to the shape of the internal bubbles in a foam of soap suds. It is found that the average transverse dimension of the cells is less than 300 microns and that the transverse dimensions of a single cell in a fully inflated condition do not vary by more than a factor of three. In the preferred structures the average transverse dimension is under 100 microns. The ratio of the cell volume to the cube of the wall thickness can be calculated and exceeds about 200. For very thin walled samples (<1 micron), the wall thickness is preferably measured with an interferometer microscope. A layer of the sample is peeled off by contact with "Scotch Tape." The layer is freed from the tape by immersion in chloroform and subsequently placed on the stage of the microscope for measurement.

The term "uniplanar orientation" employed in defining the products of this invention may be fully understood from the following discussion. "Axial," "planar," and "uniplanar" indicate different types of molecular orientation of high polymeric crystalline materials. "Axial orientation" refers to the perfection with which the molecular chain axis in a sample is aligned with respect to a given direction, or axis, in the sample. For example, prior art materials which have been drawn in one direction only (e.g., fibers or one-way stretched films) generally exhibit an appreciable degree of axial orientation along the stretch direction. "Planar orientation" refers to the perfection with which the molecular chain axis is oriented parallel to a surface of the sample. Conventional two-way stretched films generally exhibit a degree of planar orientation in that their molecules lie approximately parallel to the surface of the film, although the molecules may point in random directions within this plane. "Uniplanar orientation" is a higher type of polymer orientation in that it refers to the perfection with which some specific crystalline plane (which must include the molecular chain) in each polymer crystallite is aligned parallel to the surface of the sample. Obviously, only crystalline polymers can exhibit uniplanar orientation. There is no restriction imposed on the direction of the molecular axis within the plane of the sample. Thus, these three types of molecular orientation may occur singly or in combinations; for example, a sample might simultaneously exhibit uniplanar and axial orientation.

Electron diffraction furnishes a convenient technique for observing the presence of uniplanar orientation in the ultramicrocellular structures of this invention. A single cell wall is placed perpendicular to the electron beam. Since the Bragg angle for electron diffraction is so small, only crystalline planes essentially parallel to the beam (perpendicular to the wall surface) will exhibit diffraction. If the sample does in fact have perfect uniplanar orientation, there is some crystalline plane which occurs only parallel to the film surface and, therefore, will be unable to contribute to the diffraction pattern. Thus, the observed pattern will lack at least one of the equatorial diffractions normally observed for an axially oriented sample of the same polymer. If the degree of uniplanar orientation is somewhat less than perfect, there may be a few crystallites listed far enough to contribute some intensity to the diffraction pattern, but at least one of the equatorial diffraction intensities will be appreciably less than normal. Thus, for the purpose of this invention, a sample is considered to have uniplanar orientation when at least one of the equatorial diffractions appears with less than one-half its normal relative intensity as determined on a randomly oriented sample of the same polymer.

One precaution must be observed in making this measurement. If the sample field examined by the electron beam is stopped down so far that it "sees" only one crystallite at a time, it will always be possible, even for a randomly oriented sample, to find some crystallite oriented parallel to the sample surface which would, of course, give a "uniplanar orientation" diffraction pattern. In order to insure that the "uniplanar orientation" pertains to the whole film element and not just to one crystallite, the measurement should be made examining a field of at least 100 square microns area, which is large enough to include the contributions from many crystallites simultaneously. Other techniques of measuring uniplanar orientation and their correlation with electron diffraction measurements are described in the J. Pol. Sci. 31, 335 (1958) in an article by R. S. Stein.

The term "uniform texture" applied to the polymer in the cell walls means that the orientation, density, and thickness of the polymer is substantially uniform over the whole area of a cell wall, examined with a resolution of approximately ½ micron. This is best determined by observing the optical birefringence in the plane of a wall of a cell removed from the sample. For ultramicrocellular samples with a net over-all axial orientation, the individual cell walls will also normally exhibit an axial orientation in addition to the required uniplanar orientation. In the birefringence test, such products of the present invention will show a uniform extinction over the whole area of the cell wall. Samples with no net axial orientation must show a uniform lack of birefringence over their whole area rather than numerous small patches of orientation with each patch oriented at random with respect to the others. Lacy or cobweb-like cell walls, of course, do not have uniform birefringence over the whole area of a cell wall, and such products are readily distinguished from the uniform textured products of this invention.

In the process for producing ultramicrocellular structures (and/or fibrillated products as claimed in our U.S. Patent 3,081,519) a confined mixture of a polymer plus at least one activating liquid is heated to a temperature and pressure at which a homogeneous solution is formed, and which temperature is greater than the normal boiling point of the liquid. (The term "boiling point" or "normal boiling point" as used herein refers to the temperature at which a liquid boils under an external pressure of one atmosphere.) This solution, either under autogenous pressure or higher pressure as hereinafter defined, is extruded abruptly to a region of substantially lower pressure and temperature under such conditions that a very large number of bubble nuclei exist at the extrusion orifice. The initial concentration is chosen such that vaporization of the activating liquid rapidly cools the solution to the temperature at which the polymer precipitates, annd freezes in the polymer orientation produced in the rapid extrusion and expansion process. These events all occur within a small fraction of a second, i.e., $10^{-2}$ seconds or less.

When super-autogenous pressures on the spinning solution prior to extrusion are required to achieve adequate nucleation, these are obtained by dissolving a lower boiling additive in the solution. These will assist nucleation by increasing the "internal pressure" and lowering the surface tension of the solution. Although any soluble low boiling material is suitable, the preferred materials are those which are super-critical at temperatures above the polymer melting point. Useful additives include $N_2$, $CO_2$, He, $H_2$, methane, ethane, propane, ethylene, propylene, certain fluorinated and/or chlorinated methanes and ethanes, and equivalents.

Suitable activating liquids for use in this process should preferably have the following characteristics:

(a) The liquid should have a boiling point at least 25° C. and preferably at least 60° C. below the melting point of the polymer used;

(b) The liquid should be substantially unreactive with the polymer during mixing and extrusion;

(c) The liquid should be of a solvent for the polymer under the conditions of temperature, concentration and pressure suitable in this invention as set forth below;

(d) The liquid should dissolve less than 1% of high polymeric material at or below its boiling point;

(e) The liquid should form a solution which will undergo rapid vaporization upon extrusion, forming a non-gel polymer phase (i.e., a polymer phase containing insufficient residual liquid to plasticize the structure). In these requirements, the process differs radically from conventional foam producing or fiber producing techniques. Choice of a suitable activating liquid is, of course, dependent on the particular polymer in question. Among those found useful are methylene chloride, ethyl chloride, fluorotrichloromethane, pentane, butane, and ethanol.

The polymers suitable for use in this invention are members of the class of synthetic crystallizable, organic polymers which includes polyhydrocarbons such as linear polyethylene, stereo-regular polypropylene or polystyrene; polyethers such as polyformaldehyde; vinyl polymers such as polyvinylidene fluoride; polyamides both aliphatic and aromatic, such as polyhexamethylene adipamide and polymetaphenylene isophthalamide; polyurethanes, both aliphatic and aromatic, such as the polymer from ethylene bischloroformate and ethylene diamine; polyesters such as polyhydroxypivalic acid and polyethylene terephthalate; copolymers such as polyethylene terephthalate-isophthalate, and equivalents. The polymers should be of at least film forming molecular weight.

One of the features of this invention is the high degree of orientation of the polymer in the cell walls, which contributes to the unique strength of these structures. Therefore, a preferred class of polymers from which to make these objects is that class of polymers which responds to an orienting operation (e.g., drawing of fiber or films) by becoming substantially tougher and stronger. This class of polymers is well known to one skilled in the art and includes, for example, linear polyethylene, polypropylene, 66 nylon, and polyethylene terephthalate. Another feature of the predominantly closed cell ultramicrocellular articles of this invention is their very high degree of pneumaticity resulting directly from their unique structure, which may be looked upon as numerous tiny bubbles of gas enclosed in thin polymer skins. Retention of this gas, and hence of the structure's pneumaticity depends on a low rate of gas diffusion through the polymer walls. Therefore, another preferred class of polymers particularly for preparing ultramicrocellular structures where pneumaticity is important, is that class of polymers with low permeability coefficients for gases, such as polyethylene terephthalate. Polymer properties such as solubility, melting point, etc. are usually reflected in the properties of the ultramicrocellular product. Common polymer additives such as dyes, pigments, antioxidants, delusterants, antistatic agents, reinforcing particles, adhesion promoters, removable particles, ion exchange materials, U.V. stabilizers and the like may be mixed with the polymer solution prior to extrusion.

Only certain special combinations of concentration and temperature for the activating liquid-polymer system will produce the ultramicrocellular products of this invention and the plexifilamentary materials described in U.S. Patent 3,081,519. Thus, for a given concentration, only a limited temperature range is suitable; the minimum temperature corresponds to the freezing point of the solution, and the maximum temperature is limited by the amount of adiabatic cooling generated during the expansion process. Similarly, for a given temperature, only a limited range of concentrations is suitable, a certain minimum quantity of activating liquid being required to produce sufficient cooling for polymer precipitation on adiabatic evaporation. To prepare the ultramicrocellular products of this invention, the maximum quantity of activating liquid is determined by the point beyond which so much liquid is evaporated in cooling the solution to the precipitation temperature that the resulting cell walls are to thin to withstand the residual internal gas pressure whereupon catastrophic rupture produces the fibrillated plexifilament product. This product in turn cannot be prepared from indefinitely dilute polymer solutions, since eventually a point is reached where so much gas volume is generated per gram of polymer that the structure is no longer coherent, i.e., is not a continuous three-dimensional plexifilamentary structure.

The permissible combinations of temperature and concentration required are illustrated in the attached figures, where FIGURE 1 represents a generalized graphical definition of suitable conditions of temperature and concentration applicable to any polymer-activating liquid combination. The detailed shapes of the curves, as well as the specific values of the ordinate and abscissa will, of course, depend on the particular system chosen, and may be ascertained for any given system.

Figure 1:
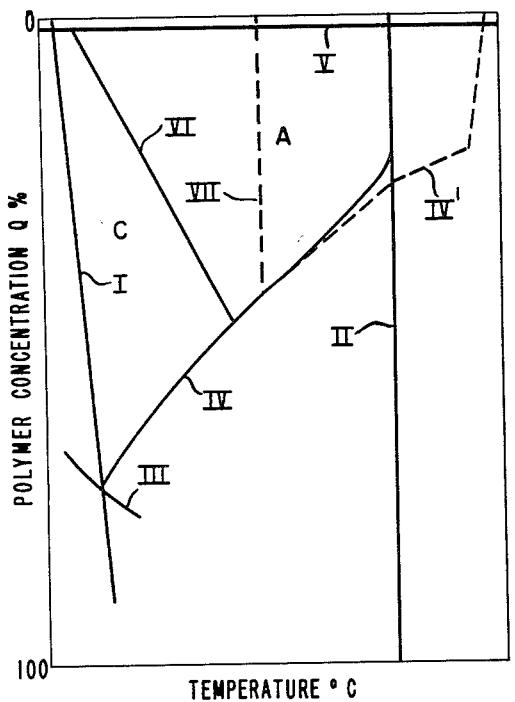

Area C bounded by Curves I, V, VI, and IV', of each figure defines operable conditions for preparing the ultramicrocellular products of this invention. Area A, bounded by Curves V, VI, and IV', defines the conditions for preparing the plexifilamentary products. The solution temperature is represented in degrees centigrade and the polymer centration is expressed in weight percent.

In general Area A represents solutions at lower polymer concentrations and higher initial temperatures compared to Area C. This corresponds to lower solution viscosities, higher activating liquid diffusion coefficients, and higher autogenous pressures which leads to more violent extrusion and activating liquid evaporation. Thus, it is not surprising that products prepared from initial conditions in Area A are the fibrillated products, while those prepared from conditions in Area C are the substantially monolithic ultramicrocellular products.

It is possible to vary the fractions of open and closed cells in these ultramicrocellular products by choosing the operating conditions close to, or far removed from, the conditions which produce a fibrillated material, as defined by Curve VI. It is even possible to operate satisfactorily somewhat beyond the bounds of Curve VI, if suitable compensation is made to control the course of the initial expansion, as by the use of a cone-shaped shroud immediately following the extrusion orifice. It is likewise possible to increase the violence of the expansion, for example by going to very high superautogeneous pressures within the pressure vessel, and thus produce fibrillated products on the Area C side of Curve VI.

Area C, bounded by Curves I, IV', V and VI, defines the initial conditions of solution temperature and concentration which, in conjunction with other requisite process factors herein described, will produce the ultramicrocellular structures of the present invention. All temperatures within Area C are higher than the normal boiling point of the activating liquid. It is obvious that some degree of control of the apparent density of the product can be achieved by choice of operating conditions within Area C, lower densities being favored by high activating liquid concentrations and choice of conditions furthest removed from Curve I.

Conditions of initial solution temperature and concentration which fall to the right of Curve VI produce a predominantly fibrillated structure. Products obtained from conditions below Curve IV' and to the right of Curve I are "sintered," and do not have the orientation of the products of this process. Initial conditions above Curve V do not produce continuous solid products, and conditions to the left of Curve I represent solid/liquid phase systems which cannot be satisfactorily extruded.

An economically attractive process comprises polymerizing the polymer directly in the activating liquid, adjusting the temperature and concentration to the desired values, and extruding the solution directly. It is possible, for example with the system polyethylene-pentane, to polymerize directly to the desired concentration, and to employ the heat of reaction to raise the temperature to the desired final pre-extrusion value, and extrude this solution.

Since the process employs relatively low concentrations, the solution viscosities are lower than those generally encountered. This feature, together with the high pressures employed, results in characteristically high extrusion velocities, ordinarily from several hundred y.p.m. to several thousand y.p.m.

In order to obtain either the very thin films of the plexifilamentary product or an ultramicrocellular product having $10^5$ or more cells/cc. and avoid producing large non-uniform cells, a very large number of bubble nuclei must be available in the solution at the instant the solution is extruded or spun from the high pressure region, with concentration and temperature corresponding to a point in Area A or C, into a region of lower pressure. The vapor generated by rapid evaporation of the activating liquid at this instant causes the resultant vapor bubbles to grow and generate the thin films or the required cell dimensions in the final product.

One method of guaranteeing the presence of a sufficiently large number of bubble nuclei is to provide for a sufficiently large pressure drop at the instant the solution passes through the orifice from one region to the other. Frequently, the autogenous pressure of the solution is not sufficiently high, so a partially soluble inert gas is added to bring the total internal pressure up to the desired value prior to extrusion. Simply increasing the mechanical pressure on the solution, as for example with a high pressure pump or piston will not provide any additional internal driving force which might be required for nucleation and bubble growth upon extrusion of the solution into the low pressure region.

The temperature at which the activating liquid alone produces sufficient pressure drop is known as the self-nucleation temperature ($T_n$). It is indicated on the figures by Curve VII.

An alternate method of providing a large number of bubble nuclei at the instant of extrusion is to incorporate a particulate solid nucleating agent in the polymer solution. A sufficient number of bubble nuclei to produce the products of this invention is estimated to be at least $10^6$ per cc., preferably $10^8$ or greater.

The very large number of bubble nuclei guarantees that the cells in the final product will be both very small and uniform. In order to produce ultramicrocellular sheets or fibers whose smallest dimension can frequently be less than 1 mm., it is essential that the dimensions of the cells themselves be very much smaller, in order to avoid gross non-uniformities in the products. Another advantage to be gained from the microsized cells is their light scattering ability, so that even thin sections of ultramicrocellular structures have high opacities. The unique and valuable suppleness of the products of this invention is likewise enhanced by the small dimensions of the very thin walled cells.

There is of course some minimum dimension below which ultramicrocellular and plexifilamentary structures cannot be prepared, since all the activating liquid will evaporate from the surface, and thus produce no internal bubbles. Under conditions of very high bubble nucleation, this minimum dimension can be made very small, and ultramicrocellular fibers have been prepared by the process of this invention with deniers at least as low as 10, corresponding to a diameter of approximately 0.3 mm.

A more detailed description of the process is given in our divisional application Serial No. 354,192, filed February 10, 1964.

The preparation of the ultramicrocellular structures of the invention is further illustrated by the following examples.

EXAMPLE I

The following ingredients were added to an 1800 cc. autoclave:

100 gms. linear polyethylene of melt index 8.6
200 gms. methylene chloride
$CO_2$ saturated at 515 p.s.i., 27° C.

This mixture was thoroughly mixed by rotation of the autoclave in an oven to raise the temperature to 149° C. with a total pressure of 1260 p.s.i. indicated on a Bourdon gauge. After making allowance for the methylene chloride contained in the free space, the calculated polymer content was 38.3 weight percent. The solution was extruded through an orifice of 0.040 inch diameter, and 0.025 inch length, having a flat face on the downstream side, and a conical entrance to the orifice on the upstream side. A continuous yarn was thereby obtained at a velocity of 5,500 yards per minute. The yarn was extremely bulky, supple and opaque. Microscopic examination showed the yarn to have a polyhedral-type cell structure with an average cell diameter of 20 microns and an average optical wall thickness of 0.3 micron.

Using the process of Example I but with a polymer concentration of 30.0% and a solution temperature of 137° C., a similar ultramicrocellular strand was obtained. The cell diameter averaged 20 microns.

EXAMPLE II

A mixture of 1,000 grams of linear polyethylene (melt index equal 0.5), 750 cc. methylene chloride activating liquid, 135 grams chlorodifluoromethane, and 5 grams "Santocel" (Monsanto trademark for silica aerogel) nucleating agent was charged into a 3 l. stainless-steel pressure vessel. The contents were heated and mixed 6 hours at 150° C. to form a homogeneus solution. Prior to extrusion, the pressure vessel was connected to a source of nitrogen gas at a pressure of 450 p.s.i. Extrusion occurred through a 10 mil annular orifice 3 inches in diameter with a 0.0625" long parallel land at a velocity of approximately 500 y.p.m. The ultramicrocellular sheet product thus produced is in tubular form, approximately 10 inches in diameter. There are about $10^6$ cells/cc. and the optical thickness of the cell walls varies from 0.3 to 0.6 micron from the interior to the surface of the sheet. The thickness of polymer at intersections of cell walls is less than 1 micron, characteristic of a polyhedral walled multicellular structure. The cell size ranges from 100 to 200 microns. The polymer molecules in the cell walls are oriented parallel to the plane of the wall to within 10 degrees, indicating a high degree of planar orientation. Electron diffraction indicates the (200) reflection is completely absent in the cell walls studied, indicating a high degree of uniplanar orientation. The polymer in the line of intersection of bubble walls shows a high degree of axial orientation along the direction of the intersection. The tubular product, slit longitudinally and opened to a sheet with basis weight of about 0.4 oz./yd.², has a TAPPI opacity of 86% and a tensile of 17 lb./in.//oz./yd.² in the machine direction.

These ultramicrocellular sheets have a bulk density of 0.02 gram/cc. as extruded. By applying pressure up to 500 p.s.i. to the face of these sheets for 1½ minutes at a temperature of 50° C. a range of sheet products of remarkably high strength in the machine direction are obtained arising from the highly oriented polymer in the cell walls. When cut into strips they may be used as backing material for pressure sensitive bandages. When two such sheets are cross lapped and bonded with adhesive (or self-bonded by pressing at temperatures near the polymer melting point), they form a composite with exceedingly high tear strength.

Figure 2:
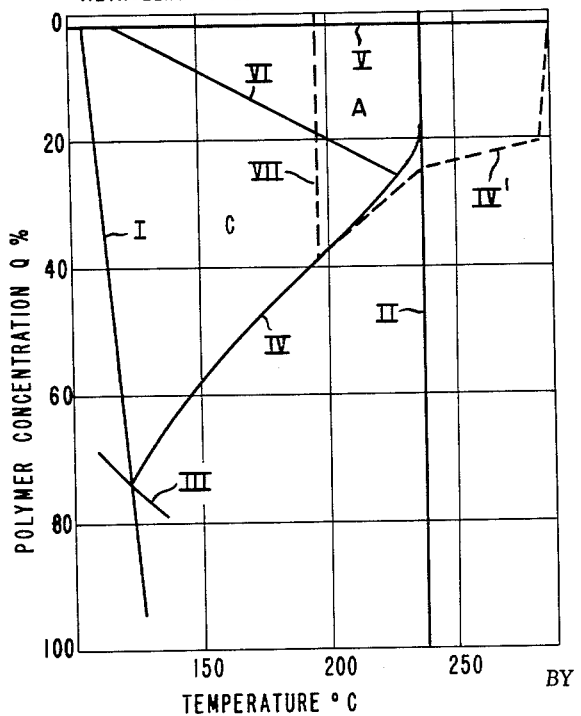
FIGURE 2 represents a graphical definition of suitable conditions of temperature and concentration for the specific combination of linear polyethylene and methylene chloride.
Figure 3:
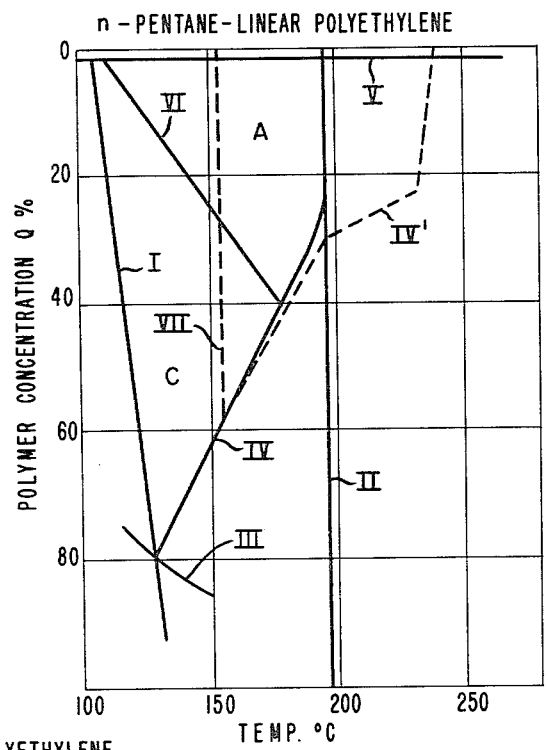
FIGURE 3 represents a graphical definition of suitable conditions of temperature and concentration for the specific combination of linear polyethylene and pentane.
Figure 4:
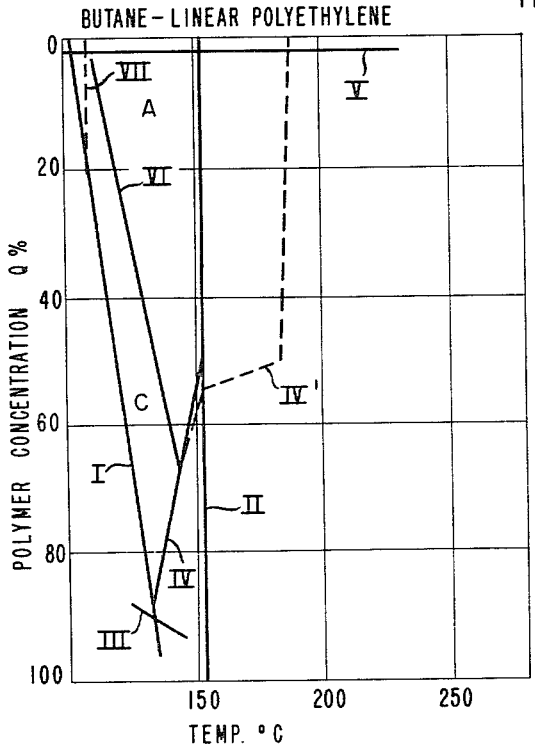
FIGURE 4 represents a graphical definition of suitable conditions of temperature and concentration for the specific combination linear polyethylene and butane.
Figure 5:
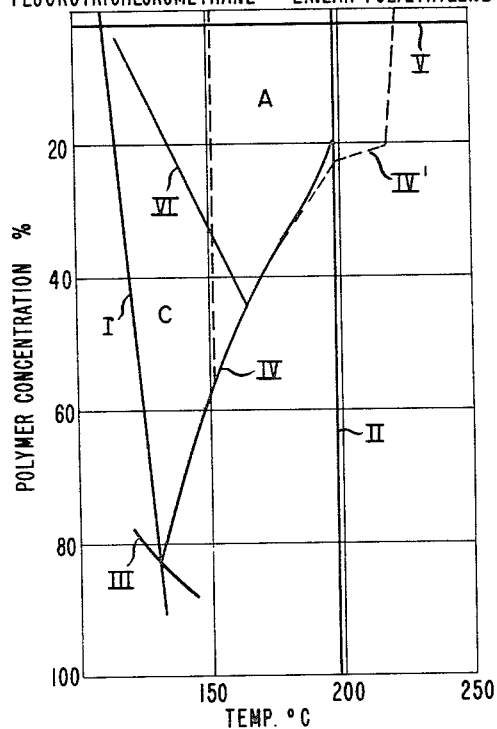
FIGURE 5 represents a graphical definition of suitable conditions of temperature and concentration for the specific combination linear polyethylene and fluorotrichloromethane.
Figure 6:
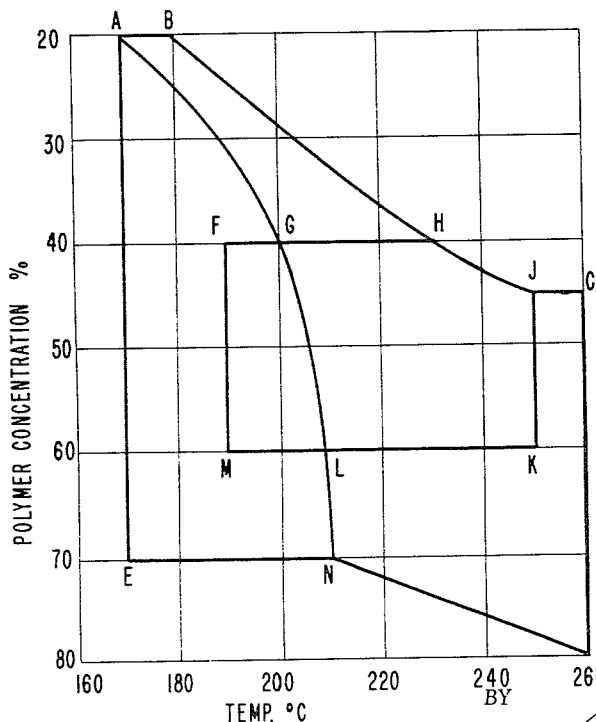
FIGURE 6 represents an empirical graphical definition of suitable conditions of initial temperature and concentration for the specific combination of polyethylene terephthalate and methylene chloride. The area ABCDE corresponds to Area C for this system, which will lead to ultramicrocellular products.
Figure 7:
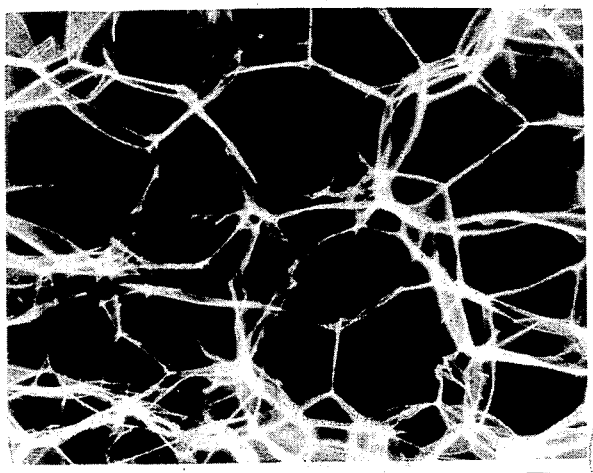

The lightly pressed cross lapped sheet structures are leather-like in their suppleness, hand, and bending characteristics. They have been made into objects such as gloves, carrying cases, insulating bags, slippers and the like. It is possible to prepare such products exhibiting a range of water vapor transmission as desired in the range from about 1 to 60 grams/meter$^2$/24 hours by varying the proportion of open and closed cells by extruding closer to, or farther from the fibrillation line as shown in FIGURE 2, Curve VI.

The cross lapped sheet products pressed at the higher pressures are paper-like, being light-weight, thin, flexible, and opaque. These properties plus their excellent tensile strength, tear resistance, and water insensitivity suit these sheets for use as a premium bagging material. Another very interesting product useful as a carbonless copy paper or thermographic copy paper is produced when a colored adhesive is employed in the laminating step, or when a pressed ultramicrocellular sheet is laminated to one or both sides of a colored sheet.

The paper-like pressed sheets have an ink receptive, directly printable surface. These pressed paper-like sheets are also ideally suited for use in electrostatic printing applications.

Incorporation of acicular particules such as potassium titanate will increase both bending stiffness and opacity of the ultramicrocellular products of this invention.

High strength light-weight ribbons or tapes may be prepared from pressed ultramicrocellular sheets by laminating strips to a parallel array of reinforcing cords.

An ultramicrocellular sheet was prepared according to the recipe of Example II, except that the quantities of chlorodifluoromethane and Santocel were 200 grams and 10 grams respectively. Nylon yarn was glued to the surface of this sheet in a parallel array and the composite sheets were cross lapped with their yarn surfaces in contact using an additional quantity of adhesive. The cross lapped structure was pressed. The ultramicrocellular sheet in this case serves as a convenient and inexpensive carrier for the non-woven grid of nylon yarns which give superior strength, dimensional stability, covering power and tuft holding capacity to the structure as a carpet backing material.

A bagging material may be prepared in similar manner as above. Pressed ultramicrocellular sheets are also useful as a surfacing material. They may be laminated to almost any substrate including metal, wood, cardboard, and impregnated non-woven fabrics as well as other types of fabrics such as knits, felts, wovens and non-wovens. A particularly interesting example is prepared by laminating four layers of ultramicrocellular sheets to one surface of a 16 mil vinyl film substrate. Two of the four layers were made from an annular die with a 10 mil gap, and the outer two layers were made using a 5 mil gap die. The total basis weight of the four plies was 2 oz./yd.$^2$. They were laminated to the vinyl film using Rhoplex AC 33 adhesive to produce a smooth surfaced structure 40 mils thick. This structure bears a remarkable resemblance to leather in many respects and may readily be embossed with sharp clear images.

EXAMPLE III

The equipment of Example II was used and 1,000 grams of a copolymer of ethylene and 1-octene of density 0.937 (corresponding approximately to a 96/4 copolymer) and melt index of 0.54, 750 ml. of methylene chloride, 130 grams chlorodifluoromethane, and 5 grams Santocel were charged into the 3 liter pressure vessel. A solution of the copolymer was formed by heating the mixture to 150° C. for 7 hours. The autogenous pressure of 385 p.s.i.g. was increased to 405 p.s.i.g. just prior to extrusion by connecting the pressure vessel to a source of nitrogen. The ultramicrocellular copolymer sheet produced was cross lapped using an adhesive (a commercial mixture of a wax plus a vinyl acetate/ethylene copolymer, "Elvax 250"), and pressed two minutes at 70° C. and 500 p.s.i. The resulting sheet of basis weight=1.3 oz./yd.$^2$, had tenacity=9.8 lbs./in.//oz./yd.$^2$, elongation =145%, modulus=42 lbs./in.//./yd.$^2$ and work-to-break=9.1 inch lbs./in.$^2$//oz./yd.$^2$ Tactic copolymers of ethylene with a minor amount of an α-olefin of from 3–10 carbon atoms as above are particularly useful for preparing the products of the invention.

EXAMPLE IV

The mixture of Example II is modified by adding 61 grams more chlorodifluoromethane and 5 grams more Santocel. This increases the autogeneous pressure of the spinning solution at 150° C. to 495 p.s.i.g. The 3 inch annular orifice is changed from a 10 mil gap to a 5 mil gap, and the solution is pressurized with nitrogen to a total of 720 p.s.i.g. just prior to extrusion, which occurs at 160 y.p.m. The ultramicrocellular sheet thus produced has a TAPPI opacity of 65% and a basis weight of 0.16±0.01 oz./yd.$^2$.

This sheet is cross lapped and laminated using "Scotch Tape" glue, and pressed at 50° C. and 500 p.s.i. to form a composite sheet whose total basis weight equals 0.40 oz./yd.$^2$, tenacity=16.4 lbs./in.//oz./yd.$^2$, elongation=129%, modulus=30 lbs./in.//oz./yd.$^2$, work-to-break=13 inch lbs./in.$^2$//oz./yd. and Elmendorf tear=17.7 g./g./m.$^2$ (TAPPI standard specimen size). These sheets are further remarkable in that the normalized water vapor transmission is not only the same for the single and cross lapped sheets, but also equivalent to that for polyethylene film This indicates that even at this very low basis weight, these pressed ultrimicrocellular sheets do not have pin holes or gross defects. This excellent uniformity at such low basis weight could only be attained by the ultra microcellular products of the present invention.

EXAMPLE V

To a mixture of 50% linear polyethylene of melt index 0.9 and 50% pentane (Phillips "Pure Grade") was added 1.5% Santocel (based on polymer weight). This mixture was confined in a pressure vessel beneath a "floating" piston above which 900 p.s.i. of nitrogen pressure was applied, heated to 155° C., and extruded through a 3/4" by 0.010" slot having an axial length of 0.015 inch. The product was a tape about four inches wide having a basis weight of 0.93 oz./yd.$^2$ Although this product is substantially monolithic (i.e. not fibrillated or fractured into gross pieces), the conditions under which it was prepared are such as to cause rupture of substantial numbers of its microcells in such a way as to form interconnecting tunnels or channels of intercomunicating cells. The product exhibits a substantial degree of uniplanar orientation as indicated by less than half the normal electron diffraction intensity shown by certain reflections.

It is to be noted that no soluble nucleation-assisting gas was employed in this example, the nitrogen pressurizing gas being separated from the solution by the free piston. Adequate numbers of bubble nuclei to produce the ultramicrocellular products of this invention are provided in this example primarily by the fact that the spinning temperature was chosen close to the self-nucleation temperature of the pentane solvent. The small quantity of Santocel added further guarantees adequate nucleation.

EXAMPLE VI

A 30 gm. charge of 2G–T/10 (0.55/0.45) (a random copolyester containing 55 mol-percent ethylene terephthalate and 45 mol-percent ethylene sebacate) was sealed in a 250 ml. stainless steel pressure vessel fitted with a spinneret having a hole 20 mils in diameter and 10 mils long. The vessel and spinneret opening were closed and the air was pumped out. A mixture of 30 gm. of ethyl chloride and 20 gm. of dichlorodifluoromethane (e.g. "Freon 12") was forced in through a valve by nitrogen under a pressure of 200 p.s.i. The polymer was brought into solution by rotating the vessel slowly end over end for 1 hour at 130°. The vessel was then cooled to 120° and the solution was mixed ½ hour and allowed to rest ¼ hour to remove gas bubbles. When the spinneret was opened, the solution issued rapidly to form a continuous, white, opaque elastic fiber. The density of the yarn was 0.064 and the yarn contained about $10^{10}$ cells/cc. Microscopic examination showed the average bubble size to be 10 x 6 microns, with walls approximately 0.1 micron thick. Yarns prepared in this manner have shown a tenacity of 0.18 g.p.d. and an elongation of 150%.

EXAMPLE VII

A cylindrical pressure vessel of 1800 cc. capacity was loaded with 100 grams polypropylene (Hercules' "Profax" 6512E), 126 cc. methylene chloride and pressurized with carbon dioxide to 500 p.s.i. at room temperature. The vessel was heated while rotating end-over-end to 170° and then cooled to 139° C. A circular orifice of 0.008″ diameter, 0.025″ long, with flat entrance and exit, was then uncovered to allow the polymer solution to flow out under the 1240 p.s.i. pressure then existing in the vessel. The polymer solution foamed up and cooled to room temperature very quickly after it emerged from the orifice, forming a continuous, smooth-surfaced, ultramicrocellular filament of 30 mils diameter. This filament had a tenacity of 0.80 gram/denier, a denier of 110, and elongation at break of 70% and about $10^7$ cells/cc. The average diameter of the cells was 50 microns and the wall thickness was 0.4 micron. The cells were defined by polyhedral walls, and the polymer comprising the walls exhibited planar orientation with an orientation angle of 10°. The high perfection of uniplanar orientation is evidenced by the complete absence of the (130) reflection and very faint (040) reflection in the electron diffraction pattern. The (110) and (003) reflections are intense and appear as sharp arcs on both the meridian and equator.

The filament was plain woven into a fabric of tight, highly opaque structure, with a springy, pneumatic character that made it useful as an underlayer for upholstery.

A colored yarn was made by following the same procedure outlined above except 10 grams of the polymer was replaced by 10 grams of a color concentrate made by milling together equal weights of green pigment and polypropylene.

EXAMPLE VIII

A procedure for making polypropylene ultramicrocellular yarn is to charge an 1800 cc. pressure vessel with:

500 grams polypropylene MI=0.8
465 grams methylene chloride
230 grams $CCl_2F$-$CClF_2$
20 grams nitrogen
2.5 grams powdered silica gel ("Santocel" 54)

After thorough mixing at 170° C., this solution was cooled to 138° C. Additional pressure was placed upon the solution by connecting a 600 p.s.i. nitrogen supply to the vessel and a 0.016″ orifice was opened. A smooth, continuous filament was wound up on bobbins and later woven. The yarn had a denier of 560, a density of 0.020 g./cc., a strength of 0.8 gram per initial denier and an elongation of 95% at break. The speed of yarn generation was readily increased by increasing the external nitrogen pressure to 1000 p.s.i. and further increased by increasing the temperature to 150° C.

The yarn readily burned when ignited by a match but was made nonflammable by dipping it in a slurry of ammonium phosphate and drying. The slurry was prepared by rolling the ingredients in a ball mill:

50 grams vinyl chloride copolymer VYHH-1
50 grams diammonium phosphate, $(NH_4)_2HPO_4$
400 grams methylene chloride Before the dip, the filament had a density of 0.020 gram per cc. and would continue to burn after the tip was ignited, even when held with the burning end up. The dip increased the density of 0.031 and made the yarn nonflammable to the extent that it would go out when the igniting match was withdrawn when held at any angle except vertically downward. A similar dip was prepared containing 10 grams of chrome yellow pigment and this gave the filament a deep coloration in addition to making it nonflammable.

EXAMPLE IX

Polypropylene ultramicrocellular yarn was made according to the procedure outlined in Example VII, however, the amount of methylene chloride used was reduced to 100 cc. and the extrusion temperature increased to 160°. The filament was cut into cylindrical pieces of highly pneumatic ultramicrocellular material, about .035″ in diameter and averaging 2″ in length. Fifty grams of this product was then dusted with 1 gram of zinc stearate powder which served as a lubricant, allowing the particles to move freely and siliently against one another. The lubricated particles were then stuffed into a life jacket from which the original kapok had been removed.

EXAMPLE X

A 3 liter stainless-steel pressure vessel was charged with 1,000 grams of linear polypropylene of melt index 0.85 (e.g. Hercules Powder Company's "Profax"), 750 ml. of methylene chloride, 400 grams of chlorodifluoromethane (e.g. Freon 22, trademark for Du Pont's refrigerant and propellent) and 2 grams of "Santocel 54" (Monsanto's silica aerogel). This mixture was heated to 155° C. overnight to form a homogeneous solution. After this solution was connected to a source of nitrogen pressure at 600 p.s.i. it was extruded through a spinneret having 25 holes each 10 mils in diameter and the ultramicrocellular filaments were collected in a barrel. The filaments were subsequently laid in parallel array between two plates 5¼″ apart and compacted under a load of 25 p.s.i. for 10 minutes. The self-coherent billet thus produced had a density of 4 lbs./ft.$^3$. Slices can be cut along any axis of this billet and compacted to densities as high as 40 lbs./ft.$^3$ by further pressing. A particular sample cut perpendicular to the fiber direction was further compacted to a density of 7.3 lb./ft.$^3$ at a final thickness of 0.5 inch. This sample had a coefficient of linear thermal expansion of 0.006% per ° C., which is the same order of magnitude as common materials of construction. It has a zero coefficient of linear water vapor expansion, a thermal conductivity value $k$=0.5 B.t.u. in./ft.$^2$ ° F. hours, and a shear strength of at least 15 p.s.i.

A similar self-coherent billet may be obtained by stuffing as-spun filaments randomly into a 2′ x 1′ box and compacting them under a 3 ton load for twenty minutes. Samples sliced from such a billet may be "molded" into three-dimensional shapes such as cups, dishes, food board trays, and the like by pressing the sheets between heated matched molds.

Billets may be prepared either from continuous or discontinuous foam filaments. They may be self-bonded, or may be impregnated with a glue or stiffening agent. The properties of the pressed slabs may be further modified by laminating to their surface thin wood veneers, metal or paper foils, etc., to form products suitable for internal wall panels, vibration dampening supports and various non-load-bearing lumber applications. Large molded slabs suitable for roofing and siding may also be prepared which combine light weight with good thermal insulation, toughness, high tear resistance, and adequate moisture vapor permeability. The slab surface accurately reproduces the mold surface so that slabs may readily be made to closely resemble the relief contours of a shingled roof or a lapped siding, for example. Addition of various fillers to the spinning solution affords further opportunity to modify properties of the pressed slabs. For example addition of sand leads to much tougher and harder (higher modulus) products.

Linear polyethylene ultramicrocellular yarns are also useful in this process for making slabs and blocks.

EXAMPLE XI

A 1.8 liter pressure vessel was charged with 500 grams linear polypropylene of melt index 0.8, 425 grams methylene chloride, 50 grams of chlorodifluoromethane and 2.5 grams "Santocel 54." Subsequent to stirring the mixture overnight at 175° C., the temperature was lowered to 150° C. This spin mix was then pushed by 700 p.s.i. nitrogen pressure through a 100-mesh screen and through an orifice. The spin mix emerged from the orifice as an ultramicrocellular strand characterized as having cells 80 microns in diameter, 0.2 micron thick walls and planar orientation to within 10 degrees of perfection. The presence of uniplanar orientation is indicated by the very weak intensity of the 040 and 130 reflections. The strand has a total denier of 470 and an overall diameter of 32 mils.

The ultramicrocellular material may be extruded as a coating on yarn which is centered and emerges at the same time as the ultramicrocellular material from the orifice. A wide variety of yarns can be used as the core. These reinforced ultramicrocellular yarns can be woven into fabrics of high strength, bulk and covering power, or twisted to produce cords and ropes.

EXAMPLE XII 400 grams of polyethylene terephthalate polymer (relative viscosity=50, vacuum oven dried at 120° C. for 24 hours) and 250 ml. of methylene chloride (dried over calcium hydride) were charged to a 1 liter pressure vessel, 70 grams of dichlorodifluoromethane (e.g., "Freon 12") was added and the vessel was closed, heated to 210° C. while turning end over end, held at 210° for ten minutes, cooled to 191° C., held 15 minutes, positioned vertically, and pressured with 800 p.s.i. nitrogen. The solution was spun at a velocity of approximately 3,000 y.p.m. through a 20 mil diameter hole 60 mils long and the fiber collected in a barrel. After heating for 15 minutes at 100° C. to expel residual solvent and realize maximum inflation, the ultramicrocellular product is a continuous, smooth, turgid fiber, density=0.023 g./cc., tenacity=0.57 g.p.d., elongation=39%, modulus=2 g.p.d. and denier=1,000 (properties determined on boiled off filaments), relative viscosity of fiber=29.2. The yarn is stable to a 20 minute boil-off, elongating only 1.6%. The strand contains about $10^8$ cells/cc. The average cell diameter is 20 microns, the wall thickness 0.1 micron, and the polymer in the cell walls exhibits planar orientation to within 10 degrees. The excellent degree of uniplanar orientation is indicated by the complete absence of both the 110 and 100 reflections. The cell walls exist in polyhedral configuration with substantially no polymeric material present other than that comprising the polyhedral cellular structure.

The high tenacity of this unique ultramicrocellular fiber permits backwinding onto cores and weaving into fabric on a power loom. The fabric was an end-and-end and pick-and-pick construction with 840/140/3.5Z nylon yarn in a chain 1; box chain 1 construction. Although there are only nine ends per inch and 4.5 picks per inch, the construction is fairly tight due to the approximately 0.1 inch diameter ultramicrocellular polyethylene terephthalate yarn. At a basis weight of only 3.7 oz./yd.² this fabric had a tongue tear of four pounds (contributed mostly by the nylon) and a thickness of 142 mils (contributed mostly by the bulky low denier ultramicrocellular polyethylene terephthalate). This fabric has an excellent thermal insulation value as evidenced by its low value of thermal conductivity, $k$, and is quite light in weight compared to the commercial insulating fabrics. This fabric survives without visible damage 10 machine wash cycles at 160° F.

Table

| | $k\left(\dfrac{B.t.u.\times inch}{hour\times °F.\times ft.^2}\right)$ | Basis Wt. (oz./yd.²) |
|---|---|---|
| 2GT ultramicrocellular/nylon fabric | 0.31 | 3.7 |
| "Orlon" [1] pile | 0.38 | 9.9 |
| Commercial jacket [2] | 0.47 | 8.0 |
| Wool | 0.34 | 11.6 |
| Curon [3]/knit fabric laminate | 0.38 | 9.0 |

[1] TM.
[2] McGregor Ram Jet Drizzler.
[3] TM.

Another fabric was woven in a plain weave from another polyethylene terephthalate ultramicrocellular yarn of 130 denier and a 260 denier nylon yarn in an end-and-end and pick-and-pick construction. This fabric, at a basis weight of only 2.2 oz./yd.², serves as an excellent substrate for vinyl coating, with the nylon contributing sufficient strength to yield grab tensile and tongue tear in excess of 55 pounds and 7 pounds, and the ultramicrocellular polyethylene terephthalate yarn contributing a luxuriant bulk (approximately 30 mils of thickness) and pneumaticity at low over-all basis weight.

In several experiments using the spinning conditions of Example XII, it was demonstrated that the denier of the polyethylene terephthalate ultramicrocellular fibers can be varied from 10 to greater than 2,000 by changing the extrusion hole diameter from 3 mils to 40 mils and larger.

The utility of the pneumaticity of these polyethylene terephthalate yarns was demonstrated by stuffing a sample in an upholstery cushion cover to a filling density of 0.73 lbs./ft.³. This cushion is compressed to 75% of its initial height under a load of 0.3 p.s.i., comparable performance to commercial cushions of other materials currently available. This cushion survived four weeks of wear testing with only moderate loss of initial height and pneumaticity.

EXAMPLE XIII

A mixture of equal parts of linear polyethylene of melt index 0.75 and linear polypropylene of melt index 1.08 was prepared by melt blending the components in a screw extruder. 1,000 grams of the polymer blend, 750 cc. methylene chloride, 15 grams "Santocel," 170 grams of chlorodifluoromethane were charged into a pressure vessel. The mixture was heated six hours at 160° C. to form a spinning solution whose autogenous pressure at 450 p.s.i. was increased to 650 p.s.i. with nitrogen pressure just prior to extrusion through a three inch annular die with a 5 mil gap. The ultramicrocellular pneumatic sheet thus prepared exhibited desirable properties characteristic of each component. For example, the polyethylene component contributed a degree of drawability and fairly good transverse tensile properties to the sheet, while the polypropylene component contributed greater stiffness and higher temperature resistance than found for similar 100% linear polyethylene ultramicrocellular sheets. In fact, this product will withstand brief exposure to temperatures as high as 150° C. without melting, whereas the melting point of linear polyethylene is approximately 135° C. There was no indication of phase separation in the spinning solution, but the two polymers appear to have frozen out at different stages in the spinning operation, as might reasonably be expected from the 30° difference in their melting points. Although the ultramicrocellular sheet is an integral structure, it gives the visual impression of being composed of a network of fine strands of ultramicrocellular material dispersed throughout its volume and aligned parallel to the machine direction (presumably the polypropylene component) imbedded in a continuous ultramicrocellular matrix (presumably the polyethylene component).

EXAMPLE XIV

A 2-inch diameter Hartig extruder is modified by the addition of a 2-section barrel extension. The screw has a 15/1 L/D feed section followed by a 4.5/1 L/D metering section and a 9/1 L/D torpedo mixing section. It is driven by a 25 hp. motor with a Dynamatic adjustable speed coupling. The end of the extruder is fitted with an orifice 0.020 inch in diameter with a 0.040 inch land (preceded by a 100 mesh screen). The barrel is heated by means of eight individually controlled heaters.

A 21 weight percent solution of unsymmetrical trichlorotrifluoroethane in methylene chloride is fed from a graduated reservoir through a heating coil at 80° C. to an injection probe protruding into the flowing polymer stream by means of a Hills-McCanna Co., "McCannameter" diaphragm pump, Model MA–888–D. The methylene chloride solution enters the polymer stream at the transition between the metering and the mixing sections.

An ultramicrocellular fiber is extruded under the following conditions:

| | |
|---|---|
| Polyethylene terephthalate (previously vacuum dried at 100° C.) | 41.7 lb./hr. |
| Unsym. trichlorotrifluoroethane | 3.35 lb./hr. |
| Methylene chloride | 12.7 lb./hr. |
| Die melt temperature | 225° C. |
| Die pressure | 800–900 p.s.i. |
| Relative viscosity: | |
| Molding pellets | 35. |
| Fiber | 28. |

The fiber produced under these conditions is macroscopically and microscopically indistinguishable from that spun by the batch process. The yarn was smooth surfaced and pneumatic and was composed of closed cells approximately 10–20 microns in diameter. The apparent density of the yarn is 0.04 g./cc.

What is claimed is:

1. An ultramicrocellular structure of a synthetic linear crystalline organic polymer of film-forming molecular weight, substantially all of said polymer being present as filmy walls of generally polyhedral shaped cells, individual filmy walls being less than 2 microns in thickness and exhibiting uniform texture as indicated by having over the whole area of the cell wall a substantially uniform thickness and density as determined interferometrically at a resolution of ½ micron and a uniform polymer orientation as evidenced by uniform extinction in a birefringence test at a resolution of ½ micron, the crystallites of said polymer in individual filmy walls exhibiting uniplanar orientation with reference to the surface of the filmy wall as indicated by the appearance of at least one of the equatorial diffractions of the wall with less than one-half its normal relative intensity when compared to a randomly oriented sample of the same polymer.

2. The ultramicrocellular structure of claim 1 having a density of 0.5 to 0.005 g./cc.

3. The ultramicrocellular structure of claim 1 having at least $10^5$ cells/cc. and wherein the average transverse dimension of the cells is under 300 microns.

4. The ultramicrocellular structure of claim 1 wherein the crystalline organic polymer is a polyhydrocarbon.

5. The ultramicrocellular structure of claim 1 wherein the crystalline organic polymer is linear polyethylene.

6. The ultramicrocellular structure of claim 1 wherein the crystalline organic polymer is a copolymer of ethylene and a minor amount of α-olefin of from 3–10 carbon atoms.

7. The ultramicrocellular structure of claim 1 wherein the crystalline organic polymer is polypropylene.

8. The ultramicrocellular structure of claim 1 wherein the crystalline organic polymer is polyethylene terephthalate.

9. The ultramicrocellular structure of claim 1 in the form of a strand.

10. The ultramicrocellular structure of claim 1 in the form of a sheet.

11. The sheet of claim 10 having a tenacity of at least 5 lbs./in./oz./yd.$^2$ in at least one direction and an opacity of at least 70% at 1 oz./yd.$^2$ 12. The ultramicrocellular structure of claim 1 wherein the filmy walls have a thickness averaging below one-half micron.

References Cited by the Examiner
UNITED STATES PATENTS

| | | | |
|---|---|---|---|
| 2,268,160 | 12/1941 | Miles | 260—2.5 |
| 2,352,725 | 7/1944 | Makwood | 260—2.5 |
| 2,850,467 | 9/1958 | Livingood | 264—205 |
| 2,867,495 | 1/1959 | Meyers | 264—205 |
| 2,888,415 | 5/1959 | Jankers | 260—2.5 |
| 3,054,761 | 9/1962 | Moore et al. | 260—2.5 |
| 3,055,846 | 9/1962 | Flack et al. | 260—2.5 |
| 3,066,356 | 12/1962 | Porter | 18—55 |
| 3,067,147 | 12/1962 | Rubens et al. | 260—2.5 |
| 3,067,469 | 12/1962 | Yarrison | 18—55 |

OTHER REFERENCES

SPE Journal: by F. H. Collins, July 1960, pages 705–709.

MURRAY TILLMAN, *Primary Examiner.*

L. H. GASTON, LEON J. BERCOVITZ, *Examiners.*